Patented Mar. 2, 1954

2,671,077

UNITED STATES PATENT OFFICE 2,671,077

PHOSPHORUS-CONTAINING POLYMERS

William B. McCormack, Wilmington, Del., assignor to E. I. du Pont de Nemours and Company, Wilmington, Del., a corporation of Delaware No Drawing. Application August 7, 1951,
Serial No. 240,811

11 Claims. (Cl. 260—88.7)

This invention relates to new phosphorus-containing interpolymers and to a process for obtaining them.

In my copending application Serial No. 240,812 there are described stable, heat-resistant polymers containing phosphorus in the form of phosphine oxide groups. These polymers are prepared by the reaction of a hydroxyl-containing compound, such as water or an alcohol, with a phosphorus-containing interpolymer in which the phosphorus is present as dihalotertiaryphosphine groups. The latter interpolymers are the subject of the present application.

It is an object of this invention to provide polymeric products containing phosphorus, which polymers may readily be converted to useful polymers containing phosphorus in the form of the stable phosphine oxide grouping. A further object is to provide a process for the preparation of these intermediate phosphorus-containing polymers.

According to the present invention, such interpolymers are prepared by contacting an olefinically unsaturated compound containing the radical $CH_2=C<$ with a mono-substituted dihalophosphine, in the presence of a free radical polymerization catalyst.

Olefinically unsaturated compounds which are useful in the preparation of the interpolymers of this invention include styrene, acrylonitrile, the lower alkyl allyl ethers such as allyl methyl ether, allyl ethyl ether and allyl n-butyl ether, and the lower alkyl esters of acrylic and of methacrylic acids such as methyl acrylate, ethyl acrylate, methyl methacrylate, ethyl methacrylate, propyl methacrylate and n-butyl methacrylate. Certain other olefinically unsaturated compounds such as 1-cyano-1-carbethoxyethylene and 1,1-dicyanoethylene may also be used. All of these compounds contain groups such as the phenyl, nitrile, carbalkoxy or alkoxymethylene groups which are so situated as to activate the vinyl group for taking part in the interpolymerization under free radical conditions. Vinyl compounds such as vinyl chloride and vinyl acetate, which are not activated to the same extent, are not operable. Ketones are undesirable in this reaction, since the carbonyl group tends to react with the dihalophosphine. Mixtures of two or more unsaturated compounds may be employed.

The dihalophosphine to be used in this process has the formula $RPX_2$, in which R represents a member of the group consisting of alkyl, aryl and aralkyl radicals and X represents a member of the group consisting of chlorine and bromine. The preferred phosphines are dichlorophenylphosphine and dichloroethylphosphine. A wide variety of phosphine derivatives having the general formula shown may be employed. Representative compounds include those in which R represents an alkyl group such as methyl, ethyl, propyl, butyl or octyl; an aryl group such as phenyl or alpha- or beta-naphthyl; or an aralkyl group such as benzyl or phenylethyl. In general, the lower members of these classes of radicals are most useful. These compounds are readily available from several well known procedures, such as by the action of phosphorus trihalide on a hydrocarbon in the presence of aluminum chloride, or by the action of phosphorus trihalide on dialkyl or diaryl mercury. Kharasch in J. Org. Chem. 14, 429 (1949) describes a process for making dichloroethylphosphine from phosphorus trichloride and lead tetraethyl. The various procedures for making these compounds are summarized in Kosolapoff, Organophosphorus Compounds, Wiley, N. Y. (1950), chapter 3.

The polymerization reaction is carried out with the aid of a free radical polymerization catalyst, such as an azonitrile, or a dialkyl or diacyl peroxide. The term "free radical polymerization catalyst" is also meant to include actinic radiation, and particularly ultraviolet light. The azonitrile catalysts which may be employed in this reaction are those set forth in detail in United States Patent No. 2,471,959 to Madison Hunt and include alpha, alpha'-azodiisobutyronitrile; alpha, alpha'-azobis-(alpha-methylbutyronitrile); alpha, alpha'-azobis-(alpha-methylisocapronitrile) and the like. Suitable peroxide catalysts include the dialkyl peroxides such as di(tert-butyl) peroxides, and the diacyl peroxides such as butyryl, lauroyl and benzoyl peroxides. The amount of catalyst which may be used may vary over a wide range from 0.1% by weight upwards. From 1 to 5% by weight of catalyst, based on the total weight of the monomeric reactants, is ordinarily desirable. The azonitriles represent the preferred class of catalysts.

The interpolymerization may be carried out at any temperature short of the decomposition point of the chemicals involved. The lower temperature limit is that at which the reaction becomes impractically slow. The preferred range is from room temperature to about 75° C. The reaction will usually be carried out at atmospheric pressure, although higher or lower pressures may be used.

The two reactants may be used in equimolecular amounts or an excess of one reactant or the other may be used to serve as a reaction medium. The amount of each reactant present is preferably between 5 and 95% by weight of the total amount of reactants. If the olefinic compound is present in excess, the composition of the interpolymer will ordinarily be affected, since the excess material can take part in the polymerization. This is not true when the dihalophosphine is present in excess. The reaction is preferably conducted in the presence of a non-reactive medium such as petroleum ether, cyclohexane, benzene, carbon tetrachloride, chloroform and the like. The mixture should be free of substances capable of converting the dihalo compounds to the corresponding oxides, such as water, alcohols and carboxylic acids.

The polymers produced according to the present invention are yellow to tan in color and vary in consistency from oils to granular solids. By treatment with water, alcohol or a carboxylic acid, they are readily converted to polymers in which the phosphorus is present as phosphine oxide groups, as described in copending application Serial No. 240,812. The phosphine oxide polymers are heat resistant and are useful as flameproofing agents for textiles and in the manufacture of molded articles and films.

The polymers produced according to the present invention contain varying amounts of phosphorus, since homopolymerization of the unsaturated compound takes place at the same time and in competition with the interpolymerization. The extent to which the interpolymerization dominates is a function of the reactivities of the specific reagents under the particular reaction conditions. As the dihalophosphine does not react with itself, the maximum phosphorus content of the interpolymer is the theoretical value for a polymer in which one mole of olefine has reacted with each mole of phosphine. This value varies with the molecular weight of the reagents. The theoretical maximum phosphorus content of the interpolymer made from dichlorophenylphosphine with acrylonitrile is 13.3%, with styrene 10.9% and with methyl methacrylate 11.1%. Actually the interpolymer always contains somewhat less phosphorus than the theoretical. The heat resistance and hydrophilic character of the polymers containing phosphine oxide groups increase in proportion to the amount of phosphorus present. As little as 0.1% phosphorus confers these properties on the polymer to a determinable extent, while at 2% phosphorus the effect is pronounced. Interpolymers containing from about 2 to 10% phosphorus represent the preferred class of products made according to this invention.

The invention is illustrated by the following examples:

Example 1

A mixture of 44.8 grams of dichlorophenylphosphine in 50 ml. of cyclohexane, 13.3 grams of acrylonitrile and 1.5 grams of alpha, alpha'-azobis-(alpha-methylisocapronitrile) is warmed at 40° C. for about three days. The azonitrile catalyst is added in 0.5 gram portions over the three day period. A cream-colored solid interpolymer deposits during this time. The interpolymer is filtered and mixed with methanol. The evolution of methyl chloride gas indicates that conversion of dichlorotertiaryphosphine groups to phosphine oxide groups is taking place. The polymer is filtered from the methanol, giving 6.2 grams of a cream-colored solid (dry basis), which contains 2.5% P and 22.5% N.

Example 2

A mixture of 50.0 grams of dichlorophenylphosphine in 50 ml. of cyclohexane and 28.0 grams of methyl methacrylate is warmed at 60° C. for three days. A total of 1.5 grams of alpha, alpha'-azobis - (alpha - methylisocapronitrile) is added in three 0.5 gram portions during this period. At the end of this time, the fluid upper layer is decanted and the viscous colorless oily lower layer is treated with methanol to convert the dichlorotertiaryphosphine groups to phosphine oxide groups. The resulting plastic mass is washed with alcohol and dried to give 28.6 grams of clear glassy polymer containing 2.9% P.

Example 3

A mixture of 50.0 grams of dichlorophenylphosphine in 50 ml. of cyclohexane and 29.1 grams of styrene is warmed at 60° C. for two days. A total of 2.0 grams of alpha, alpha'-azobis-(alpha-methylisocapronitrile) is added in four 0.5 portions over the two day period. The supernatant liquid is decanted from the viscous colorless oily lower layer. Methanol is added to the polymeric material. The evolution of methyl chloride indicates the conversion of dichlorotertiaryphosphine groups to phosphine oxide groups. The mixture is then poured into water to precipitate the polymer. A white gummy mass is formed which gives, after drying, 17.6 grams of a glassy product containing 7.3% P.

Example 4

A mixture of 4.1 grams of dichlorophenylphosphine and 2.0 grams of allyl ethyl ether in 5 ml. of cyclohexane is warmed at 40° C. for seven days. Alpha, alpha'-azobis-(alpha-methylisocapronitrile) is added as polymerization catalyst in two 0.05 gram portions, one on the first and one on the fourth day. At the end of the seven days, a dark viscous oily lower layer has formed. This is washed with petroleum ether and treated with methanol. Methyl chloride is evolved. The methanol solution is diluted with water, giving an insoluble oil which is dried to give 2.5 grams of a clear reddish oil containing 15.1% P.

Example 5

A mixture of 50.0 grams of dichlorophenylphosphine, 19.1 grams of isoprene, 14.9 grams of acrylonitrile and 0.5 grams of alpha, alpha'-azobis-(alpha-methylisocapronitrile) in 50 ml. of cyclohexane is warmed at 40° C. for twenty hours. A white to cream-colored granular solid precipitates. This is filtered and treated with methanol. Methyl chloride is evolved, indicating the conversion of dischlorotertiaryphosphine groups to the corresponding phosphine oxide groups. The mixture is diluted with water, upon which an oily layer separates. This oil is washed with water and dried to give 20.0 grams of a transparent brownish glassy polymer containing 15.0% P and 0.9% N.

I claim:

1. The process of preparing a phosphorus-containing interpolymer which comprises contacting an olefinically unsaturated compound containing the radical $CH_2=C<$, selected from the group consisting of styrene, acrylonitrile, the lower alkyl allyl ethers, and the lower alkyl esters of acrylic and of methacrylic acids, with a mono-substituted dihalophosphine having the formula $RPX_2$ in which R represents a member of the group consisting of alkyl, aryl and aralkyl radicals and X represents a member of the group consisting of chlorine and bromine, in the presence of a free radical polymerization catalyst and in the absence of substantial amounts of hydroxyl-containing compounds.

2. A process according to claim 1 in which the olefinically unsaturated compound is styrene.

3. A process according to claim 1 in which the olefinically unsaturated compound is methyl methacrylate.

4. A process according to claim 1 in which the olefinically unsaturated compound is acrylonitrile.

5. The process of preparing a phosphorus-containing interpolymer which comprises contacting styrene with dichlorophenylphosphine in the presence of an azonitrile free radical polymerization catalyst and in the absence of substantial amounts of hydroxyl-containing compounds.

6. The process of preparing a phosphorus containing interpolymer which comprises contacting methyl methacrylate with dichlorophenylphosphine in the presence of an azonitrile free radical polymerization catalyst and in the absence of substantial amounts of hydroxyl-containing compounds.

7. The process of preparing a phosphorus-containing interpolymer which comprises contacting acrylonitrile with dichlorophenylphosphine in the presence of an azonitrile free radical polymerization catalyst and in the absence of substantial amounts of hydroxyl-containing compounds.

8. An interpolymer of an olefinically unsaturated compound containing the radical $CH_2=C<$, selected from the group consisting of styrene, acrylonitrile, the lower alkyl allyl ethers, and the lower alkyl esters of acrylic and of methacrylic acids, and a mono-substituted dihalophosphine having the formula $RPX_2$ in which R represents a member of the group consisting of alkyl, aryl and aralkyl radicals and X represents a member of the group consisting of chlorine and bromine, said interpolymer containing at least 0.1% chemically bound phosphorus.

9. An interpolymer of styrene and dichlorophenylphosphine, said interpolymer containing at least 0.1% chemically bound phosphorus.

10. An interpolymer of methyl methacrylate and dichlorophenylphosphine, said interpolymer containing at least 0.1% chemically bound phosphorus.

11. An interpolymer of acrylonitrile and dichlorophenylphosphine, said interpolymer containing at least 0.1% chemically bound phosphorus.

WILLIAM B. McCORMACK.

References Cited in the file of this patent

UNITED STATES PATENTS

| Number | Name | Date |
|---|---|---|
| 2,382,812 | Parker | Aug. 14, 1945 |
| 2,387,521 | Martin | Oct. 23, 1945 |
| 2,520,601 | Lee | Aug. 29, 1950 |